United States Patent [19]

Marquis et al.

[11] 4,053,513

[45] Oct. 11, 1977

[54] BARIUM NITRIDE CATALYSTS FOR THE PREPARATION OF DIAMINO-DIPHENYLMETHANES

[75] Inventors: Edward T. Marquis; Lewis W. Watts, Jr., both of Austin, Tex.

[73] Assignee: Texaco Development Corporation, New York, N.Y.

[21] Appl. No.: 760,613

[22] Filed: Jan. 19, 1977

[51] Int. Cl.$^2$ ............................................. C07C 85/145
[52] U.S. Cl. ........................... 260/570 D; 260/570.5 P; 260/570.9
[58] Field of Search ............................ 260/570 D

[56] References Cited

U.S. PATENT DOCUMENTS

| | | | |
|---|---|---|---|
| 3,676,497 | 7/1972 | Recchia et al. | 260/570 |
| 3,965,182 | 6/1976 | Worrel | 260/570 |

Primary Examiner—Robert V. Hines
Attorney, Agent, or Firm—Carl G. Ries; Thomas H. Whaley; James L. Bailey

[57] ABSTRACT

Covers a method of preparing diaminodiphenylmethanes and higher homologues thereof which comprises the step of condensing aniline and formaldehyde in the presence of a barium nitride catalyst. In another embodiment the barium nitride catalyst is used in conjunction with a silicon nitride catalyst.

4 Claims, No Drawings

BARIUM NITRIDE CATALYSTS FOR THE PREPARATION OF DIAMINO-DIPHENYLMETHANES

BACKGROUND OF THE INVENTION

1. Field of the Invention

This invention relates to the field of polyamines.

2. Description of the Prior Art

The process of producing aromatic polyamines by the reaction of aniline and formaldehyde is well known and described for example in U.S. Pat. Nos. 2,683,730; 3,277,173; 3,344,162; and 3,362,979. By phosgenating these amines the corresponding isocyanates are obtained. The polyamines produced by the condensation of aniline and formaldehye usually consist of a mixture of poly(methylenephenylamines) of functionality greater than two and the 2,2', 2,4' and 4,4' isomers of diaminodiphenylmethane. By reaction with phosgene a corresponding mixture of polyisocyanates and diisocyanates is prepared which is useful in producing, for example, polyurethane foam.

One mode of reacting aniline with formaldehyde is to effect this reaction in the presence of a strong mineral acid, such as hydrochloric acid. Here a reaction occurs between the corresponding aniline hydrochloride and formaldehyde to provide a reaction mixture which, upon neutralization with a base, may be treated to recover the polyphenylamines. This process has left much to be desired. For example, it is necessary to utilize large quantities of both a mineral acid and a base which adversely affect the economics of the process and also the ease of conducting the reaction. In addition, the use of large quantities of mineral acids and the bases presents a severe corrosion problem. Also, the inorganic salt formed poses environmental difficulties with respect to disposal and/or recovery.

As an improvement to the conventional mineral acid catalyzed aniline-formaldehyde condensation use of a solid acidic siliceous catalyst has been proposed (see U.S. Pat. No. 3,362,979). This is economically favorable over the conventional hydrochloric acid catalyzed process since use of large quantities of corrosive acid and caustic are avoided. However, even this process has some drawbacks, particularly, in that the rate of reaction is not as rapid as desired and rearrangement of product amines at conventional conditions is not considered sufficiently complete.

SUMMARY OF THE INVENTION

The invention relates to a process for making aromatic polyamines by the reaction of aniline and formaldehyde in the presence of a barium nitride catalyst.

DESCRIPTION OF THE PREFERRED EMBODIMENTS

A method of preparing diaminodiphenylmethane and higher homologues thereof has now been discovered. The invention comprises the step of condensing aniline and formaldehyde in the presence of a barium nitride catalyst. A mixture of products is produced which includes the diaminodiphenylmethane isomers comprising the 2,2', 2,4', and 4,4' diamine isomers and higher homologues thereof or polymethylene polyphenylamines. The later are higher molecular weight condensation polymers of the formaldehyde and the aniline and are considered homologues of the simple diaminodiphenylmethane isomers.

Depending upon reaction conditions, amount of catalyst employed, proportions of the reactants, and other variables the proportions of diamines, and higher polyamines present in the final reaction mixture may be widely varied. However, usually the reaction mixture contains 20–80 percent by weight of diamine with the remainder being higher polyamines thereof. More often the percentage of diamines in the mixture is 30–70 percent and most often ranges from about 35 to about 55 weight percent. Correspondingly the polymeric products higher than the dimer products usually in the preferred embodiment range from 30 to 70 percent by weight, and most often range from about 45 to about 65 percent by weight. With respect to product distribution of the dimer usually 1–10 percent by weight of total dimer is the 2,2' isomer, with the remainder being 2,4' and 4,4' isomers. Most often the content of dimer is 1–5 percent 2,2' isomer with the remainder, or 95–99 percent being 2,4' and 4,4' isomers, based on total dimer content. Generally the higher molecular weight polymethylene polyphenylpolyamines have an average functionality of from about 3.0 to about 4.5, more often 3.5–4.0.

Barium nitride ($Ba_3N_2$), of course, is a known material which needs no further elaboration.

The amount of catalyst used here may be varied according to the choice of the experimenter. Usually, however, 0.5–3.0 percent by weight of catalyst based on weight of aniline is employed. More often, the amount of catalyst utilized is 1–2 percent by weight based on aniline weight.

In order to prepare the methylene-bridged polyphenyl polyamines (term includes both diaminodiphenylmethane isomers and higher homologues thereof or higher polymers) the following process conditions are preferred.

The molar ratio of aniline to formaldehyde may be varied within comparatively wide limits. Thus, for example, from about 1 to about 10 mols of aniline may be employed per mol of formaldehyde. In general, at the lower aniline: HCHO ratios, such as ratios of from about 1:1 to about 2.5:1, the higher polymers will be formed preferentially and the yield of higher polymers is in excess of the yield of dimer. However, as progressively larger amounts of aniline are used, the yield of dimer is progressively increased at the expense of polymer yield. Thus, with aniline to formaldehyde ratios of from about 3:1 to about 10:1 or more, the reaction product will be composed primarily of the dimer. As indicated above, the dimer will be formed as a mixture of the 2,2'-2,4' and 4,4'-diamine isomers.

Formaldehyde may be employed in any of its commercially available forms. Thus, formalin, paraformaldehyde, "stabilized" methanol solutions of formaldehyde, etc., may be employed.

The reaction may be conducted in the presence or absence of a solvent. When a solvent is to be employed, it may be any of the conventionally known hydrocarbon solvents or chlorinated hydrocarbons, such as aromatic or aliphatic solvents boiling within the range from about 100° to about 200° C. The solvent should be employed in an amount sufficient to provide a single phase solution of the amine compound.

The reaction conditions to be employed may suitably include a reaction temperature within the range of about 100° to about 300° C., and more preferably within the range of about 150° to about 250° C.

Pressure is not particularly critical with respect to the process. However, the pressure should be sufficient to provide for liquid phase reaction conditions. Thus, pressures ranging from atmospheric up to 1000 psig may be employed.

The reaction proceeds smoothly under the above-described conditions, and is normally substantially complete upon addition of the formaldehyde. However, because of the exothermic nature of the reaction, it is normally preferable to add the formaldehyde at a rate such that the desired reaction temperature can be maintained. It is normally possible to bring the reaction to completion within from about 5 minutes to about 8 hours in conventional equipment. More often the reaction is complete in ¼-4 hours.

The polyaminopolyphenylmethanes of the present invention are recovered from the reaction mixture by any desired means. They are conveniently recovered by filtering the catalyst and removing water and excess aniline under reduced pressure. The bottoms from these operations will consist of diamine and polyamine in proportions depending on the ratio of aniline to formaldehyde, as indicated above. If it is desired to separate the diamine from the polyamine, this is easily accomplished by simple distillation whereby the diamine is flashed from the nonvolatile polyamine residue. The overhead product may be removed, for example, at from about 170° to about 200° C. at about 0.5 to about 0.025 mm. Hg pressure and will consist essentially of diaminodiphenylmethane.

The dimer and higher products of the present invention are useful for a variety of purposes. For example, they may be utilized as raw materials for the production of the corresponding polyisocyanates, or used as such as epoxy curing agents.

The avantages in using a barium nitride catalyst in the process of the invention are many and varied. In the first place a nearly completely rearranged product is achieved in a desirable manner. In addition, many commonly used catalysts such as hydrochloric acid are highly corrosive, whereas there is no indication here that the catalysts used here are corrosive in any manner. Again, it has been found that barium nitride is considerably more active than other known catalysts such as silica-alumina, which latter catalyst does, however, avoid the discussed problems of corrosion. Again, only small amounts of catalyst need be employed and the catalyst is readily removed from the reaction mixture by filtration. Surprisingly, relatively complete rearrangement of product amine occurs at conditions which, with silica-alumina catalyst, do not afford a completely suitable product.

It was completely surprising that barium nitride was active in the above discussed process. In the first place, the type of condensation reaction presented here usually involves use of an acid catalyst. One would not a priori predict the acid character of barium nitride, and therefore cannot predict whatsoever the fact that it would catalyze this reaction to any extent.

In addition, as will be seen below, of a great number of nitrides screened, surprisingly only barium nitride was active in the instant process. In another embodiment, barium nitride is also used in conjunction a silicon nitride ($Si_3N_4$). The silicon nitride itself was used prior to this as a catalyst and found to be inactive. Yet when used in conjunction with barium nitride, combination of the two gave enhanced results compared to use of barium nitride alone, apparently a true situation of synergism.

When used in conjunction with barium nitride, the silicon nitride can be used in amounts again ranging within 0.5–3.0 weight percent of silicon nitride based on the weight of aniline employed. In the usual case, the amount of combined catalyst utilized is 0.5–2 percent by weight based on aniline weight.

The following examples illustrate the process of the invention. It is understood, of course, that these examples are merely illustrative, and that the invention is not to be limited thereto.

EXAMPLE I

To a 1-l. stirred ss clave was added aniline (186 g, 2.0 moles), formaldehyde (30.0 g, 1.0 mole) and barium nitride ($Ba_3N_2$) (1.9 g, 1.0% basis aniline) and silicon nitride ($Si_3N_4$, 1.9 g, 1.0% basis aniline). Both nitrides were obtained from Ventron Corporation. The clave was flushed with $N_2$, sealed, then heated to 200° C. with stirring and held there for 1 hour. The reactor crude was stripped of water, filtered, and analyzed by NMR spectroscopy. The crude amine was found to contain only 8.7% N-benzyl type secondary amine and only 4.3% N-methyl secondary amine. Under identical reaction conditions, a noncatalytic run's (no catalyst) product contained some 23% secondary amine of the aminal type and some 33% N-benzyl secondary amine and 14.5% N-methyl secondary amine. Further, a silica alumina catalyzed run (1% catalyst) afforded a product with 12.1% N-benzyl secondary amine and 6.1% N-methyl secondary amine. From the results of the above noncatalyzed run and the silica alumina catalyzed run one can readily see the superiority of the product from the silicon nitride-barium nitride cocatalyzed run. From Example II below (silicon nitride alone) one can see that by itself silicon nitride exhibits no apparent catalytic activity.

EXAMPLE II

To a 1-l. stirred ss clave was added 186 g aniline (2.0 moles), 30 g formaldehyde (as formalin, 1.0 mole formaldehyde) and 1.9 g silicon nitride ($Si_3N_4$). The clave was flushed with $N_2$, sealed, and heated to 200° C. and held there for one hour. The crude amine, after water removal and filtration, was examined in the NMR and found to contain some 21.5% aminal type secondary amine and 33.8% N-benzyl secondary amine and 13.8% N-methyl secondary amine.

EXAMPLE III

To a 1-l. stirred ss clave was added 372 g aniline (4.0 moles), and 60.0 g formaldehyde (2.0 moles) added as formalin. No catalyst was used here. After purging with $N_2$, the clave was sealed and the reaction mixture was heated to 200° C. and held there for 1 hour. The crude amine after water removal contained some 22.9% aminal type secondary amine, some 32.8% N-benzyl secondary amine and 14.5% N-methyl secondary amine.

EXAMPLE IV

This run was carried out as in Example I except that barium nitride (($Ba_3N_2$) was the sole catalyst (1.9 g or 1%). The crude amine was stripped to afford a product amine whose NMR indicated the presence of 11.4% N-benzyl secondary amine and 5.7% N-methyl secondary amine. Clearly, this product is far superior to the noncatalyzed case (Example III) but is not quite as good as the product from the run (Example I) using both Ba₃N₂ and silicon nitride (Si₃N₄). Yet the run with silicon nitride alone (Example II) was essentially identical to results from the noncatalyzed run, proving silicon nitride is not a catalyst, but acts synergistically with barium nitride (Example I vs. IV).

EXAMPLE V

In an experiment run like Example III except that 3.7 g silica alumina (1%) was also present, the product after workup was found to contain 12.1% N-benzyl secondary amine and 6.1% N-methyl secondary amine.

EXAMPLE VI

This run was carried out as in Example I except that tantalum nitride (TaN) and vanadium nitride (VN) were used as catalysts, 1.9 g each (1% each). The crude amine contained some 30% N-benzyl secondary amine, 13% aminal type secondary amine and 9% N-methyl secondary amine. These results indicate complete lack of catalytic activity since the product is essentially similar to that of Example III (no catalyst).

EXAMPLE VII

This run was made as in Example I, except that mixed iron nitrides (Fe₂N + Fe₄N, 1.9 g, 1%) were used as catalysts. The crude amine contained 36.8% N-benzyl secondary amines, 32.9% secondary amines of the aminal type and 12.9% N-methyl secondary amines (by NMR).

EXAMPLE VIII

This run was made as in Example I, except that mixed tungsten nitrides (W₂N + WN, 1.9 g, 1%) were used as catalysts. The crude amine contained 34.6% N-benzyl secondary amines, 21.0% N-benzyl secondary amines of the aminal type and 13.5% N-methyl secondary amines (NMR).

EXAMPLE IX

This run was carried out as in Example I, except that manganese nitride (Mn₄N, 1.9 g, 1%) and chromium nitride (CrN, 1.9 g, 1%) were used as catalysts. The crude amine was found to contain 30.5% N-benzyl secondary amine, 6.5% N-benzyl secondary amine of the aminal type, and 17.7% N-methyl secondary amine (NMR).

In Table I are summarized the results obtained in the examples described above which show that of the nitrides screened (13) only barium nitride is a significantly active catalyst, and that it is more active than even silica alumina and further that although silicon nitride is by itself inactive it appears to exhibit a favorable synergistic effect on barium nitride.

TABLE I

| Example No. | Catalyst(s) | Rel A % N-Benzyl Secondary Amine | Rel A % N-Benzyl Secondary Amine of the Aminal Type | Rel A % N-Methyl Secondary Amine |
|---|---|---|---|---|
| I | Ba₃N₂ / Si₃N₂ | 8.7 | 0 | 4.3 |
| IV | Ba₃N₂ | 11.4 | 0 | 5.7 |
| V | Silica Alumina | 12.1 | 0 | 6.1 |
| II | *Si₃N₂ | 33.8 | 21.5 | 13.8 |
| III | No catalyst | 32.8 | 22.9 | 14.5 |
| VI | *TaN / *VN | 29.6 | 13.1 | 9.0 |
| VII | *Fe₂N / *Fe₄N | 36.8 | 32.9 | 12.9 |
| VIII | *W₂N / *WN | 34.6 | 21.0 | 13.5 |
| IX | *Mn₄N / *CrN | 30.6 | 6.5 | 17.7 |

*Essentially noncatalysts on the basis of the N-benzyl secondary amine remaining in the crude amine as compared to the 32.8% remaining in the amine from a noncatalyzed run.
Note:
Brackets indicate that both catalysts were used simultaneously in the run.

We claim:
1. A method of preparing diaminodiphenylmethane and higher homologues thereof which comprises the step of condensing aniline and formaldehyde in the presence of a barium nitride catalyst.
2. The method of claim 1 wherein said catalyst is present in an amount ranging from about 0.5 to about 3.0 percent by weight based on the weight of aniline present.
3. The method of claim 2 wherein said catalyst is present in an amount of 1-2 percent by weight.
4. The method of claim 1 wherein silicon nitride is employed as a co-catalyst.

* * * * *